United States Patent [19]

Elliott et al.

[11] Patent Number: 4,594,507
[45] Date of Patent: Jun. 10, 1986

[54] THERMAL IMAGER

[75] Inventors: Charles T. Elliott; Richard G. Humphreys; Rex Watton, all of Malvern, England

[73] Assignee: The Secretary of State for Defence in Her Britannic Majesty's Government of the United Kingdom of Great Britain and Northern Ireland, London, England

[21] Appl. No.: 653,725

[22] Filed: Sep. 24, 1984

[30] Foreign Application Priority Data

Oct. 14, 1983 [GB] United Kingdom ................ 8327552

[51] Int. Cl.⁴ .............................................. G02F 1/13
[52] U.S. Cl. ................................... 250/331; 250/330; 250/332
[58] Field of Search ............... 250/331, 332, 330, 351

[56] References Cited

U.S. PATENT DOCUMENTS

| 2,824,235 | 2/1958 | Hahn, Jr. et al. | 250/351 |
| 3,153,146 | 10/1964 | Lady | 250/330 |
| 4,262,198 | 4/1981 | Gupta et al. | 250/340 |

FOREIGN PATENT DOCUMENTS 2001107 7/1971 Fed. Rep. of Germany ...... 250/332

OTHER PUBLICATIONS

B. F. Lamouroux and B. S. Prade, "Signal-to-Noise Ratio Analysis of a Digital Polarimeter Application to Thermal Imaging" *Rev. Sci. Instrum.* vol. 54, No. 5, (May 1983), pp. 582-585.
Y. B. Andre, J. P. Chambaret, B. L. Lamouroux and B. S. Prade, "Transient Thermal Behavior of a Liquid Crystal Target" *Infrared Physics* vol. 20, (1980), pp. 341-347.
Y. V. Andre, J. P. Chambaret, M. A. Franco and B. S. Prade, "Infrared Video Camera at 10 μm" *Applied Optics* vol. 18, No. 15, (Aug. 1979), pp. 2607-2608.

*Primary Examiner*—Alfred E. Smith
*Assistant Examiner*—Constantine Hannaher
*Attorney, Agent, or Firm*—William R. Hinds

[57] ABSTRACT

A thermal imager includes an infrared sensitive light valve and a light source arranged to illuminate the full responsive area of the valve. The imager also includes an optical stage having focussing optics for forming an infrared image upon the surface of the valve and a chopper for modulating infrared radiation from a scene. Modulated light from the valve is read out in parallel by a detector array, and frame signals corresponding to alternate positions of the chopper are subtracted to provide uniformity correction. The light valve may comprise an infrared sensitive optically active liquid crystal cell and an analyzer adjusted to near extinction. An optical processor comprising a lens and an apodized stop filter lies in the light path between the valve and the detector array. The light source may comprise an array of light emitting diode elements and the filter a number of corresponding off-axis stop regions.

29 Claims, 6 Drawing Figures

THERMAL IMAGER

TECHNICAL FIELD

The invention disclosed herein concerns thermal imagers. Such imagers include an infrared sensitive detector, usually sensitive to radiation in either of the 3–5 or 8–14 $\mu$m bands, and one or more infrared optical components by which means infrared radiation from a thermal scene is focussed upon the surface of the detector. Electrical signals, produced as a result, are utilised by a video display to reconstruct and make visible the features of the thermal scene.

A most common class of imager, the class of scanning imagers, uses a small area detector together with a mechanically operated scan mechanism. Relative scan motion, between the detector and the image, allow the reconstruction of a large area image. However, such imagers require power for driving the scan mechanism; and the latter contributes significantly to the bulk, weight and cost of the device. It is also usual to cool the detectors of such imagers to low temperature. Again this adds to bulk, weight, cost and power demand.

An alternative class of imager, the class of staring imagers, uses a large number of small area detector elements arranged in two-dimensional array, and a stationary image is formed over the array surface. This also includes some form of signal storage, and a multiplex output for the stored signal. The detector may be of pyroelectric material, in which case it is usual to employ a chopper amongst the optical components, and to process the output signal so that successive frame signals corresponding to the open and shut positions of the chopper are inverted.

Those employing photovoltaic or photoconductive detectors still require low temperature cooling. Pyroelectric detectors—including for example the pyroelectric vidicon, require neither cooling nor a mirror scan mechanism. Their sensitivity to temperature contrast in the scene and spatial resolution, however, are somewhat limited in comparison.

In yet another class of imagers, the class of direct view thermal imagers, each detecting element is used to produce a directly visible output. This construction allows use of neither a chopper nor of electronic processing. Uniformity over the area of the imager is usually difficult to achieve, and since electronic uniformity correction is not possible, the performance is generally poor. Whilst these imagers can be fairly sensitive, their speed of response is usually low.

BACKGROUND ART

A first solution to the problems outlined above, has been presented by Prade et al. (Refer to: "Infrared video camera at 10 $\mu$m", Applied Optics Vol. 18 No. 15 (August 1979) pages 2607-8; "Transient Thermal Behaviour of a liquid crystal target", Infrared Physics Vol. 20 (1980) pages 341-7; and, "Signal-to-noise ratio analysis of a digital polarimeter application to thermal imaging", Review of Scientific Instruments, Vol. 54 No. 5 (May 1983) pages 582-5.)

This prior art imager includes a liquid crystal cell whose optical activity varies point by point according to the temperature of each sample point. The device is read out serially using a laser beam scanned across the cell by a vibrating mirror. The laser beam is split by a Wollaston prism or equivalent means, and two detectors are provided, one for each split beam. The ratio of the detector output signals provides a measure of the degree of polarization rotation at each laser-scanned or sampled point. Inhomogeneity over the plane of the cell is a characteristic of liquid crystal cells of this kind, and is often referred to as fixed pattern noise. Prade et al correct for this by subtracting a constant predetermined reference image pattern from that detected. However, no correction is made for other undesirable effects, i.e., changes in cell inhomogeneity and fluctuation in illuminating laser beam intensity.

DISCLOSURE OF THE INVENTION

The present invention provides a thermal imager including:
(1) a light valve responsive to absorption of infrared radiation by variation in reflectivity or transmittivity at shorter wavelengths,
(2) imaging means for imaging a thermal scene on to the light valve,
(3) modulating means arranged for intensity modulation of radiation from the scene falling on the light valve,
(4) a light source arranged for illumination of the light valve's responsive region,
(5) means for detecting light from the source after passage via the light valve, and
(6) electronic processing means arranged to provide an output signal indicating changes in detected light intensity produced by modulation of radiation from the scene received by the light valve.

As compared to the prior art of Prade et al., the invention provides the advantage of compensation for changes in cell inhomogeneity and light source intensity variation by deriving an output signal corresponding to changes in infrared intensity, instead of detecting absolute infrared intensity affected by these previously uncompensated effects.

In a preferred embodiment, the invention includes detecting means in the form of an array of detectors each arranged to indicate a pixel intensity corresponding to light received from a respective sub-region of the light valve responsive region. In addition, in this embodiment the light source is arranged to illuminate simultaneously all of the responsive region of the light valve. Accordingly, each detector of the array monitors at all times a respective modulated pixel intensity. As a result, each detector can receive light over much loger modulation periods than in the prior art. In this embodiment readout is in parallel. Parallel readout avoids the introduction of sampling noise: high frequency noise is rejected if the pulse duration of read out light is a significant fraction of the half-period of modulation. The vibrating mirror used in the prior art must scan over the light valve, and consequently spends much less time reading out individual pixels than in the present invention. The prior art device therefore exhibits a much greater noise bandwidth than the present invention, noise bandwidth being an inverse function of scan or readout time. Furthermore, obviating the requirement for a vibrating mirror in accordance with the invention reduces cost, power consumption, bulk and precision engineering requirements whilst increasing reliability.

The light cell incorporated in the invention preferably includes heat sinking means coupled to the cell's responsive region via a high thermal impedance, the degree of coupling being substantially constant over the region. This provides an appropriate thermal response time for the cell together with a thermal environment which is uniform over the responsive region.

In the imager of the invention, the image is not viewed directly, but is collected by the array of detectors—for example detectors at the front end of a charge coupled device (CCD) TV camera or TV vidicon. The image can be enhanced electronically, contrast-stretch for example can be provided together with uniformity correction.

As has been mentioned, a chopper may be used as a modulating means to modulate radiation from the thermal scene. The shorter wavelength light traverses the light valve and is detected by the array of detectors. Successive frames, taken with the chopper in and out of beam, are stored and subtracted electronically by the processing circuit indicating changes in intensity produced by the chopper. Some of the processing electronics can be based on those required for large market commercial TV applications, and may include a frame store. The chopper has the effect of imposing a frequency response on the system; it will respond to all temporal frequencies up to half the chopper frequency. The subsequent subtraction tends to reject low frequency noise. It also gives an effective frame to frame uniformity correction. Any temporal change in uniformity is thus compensated where such changes are manifest in both light and dark field frames. Furthermore, since the fall area of the light valve is illuminated, i.e., all points simultaneously, any fluctuatiion in light level is the same at all points. Thus such fluctuations do not give rise to any additional pattern noise.

The light valve may comprise a combination of a thermally sensitive optically active liquid crystal cell and an analyser. Here it is advantageous to arrange the analyser to work appropriately close to an extinction. The read-out light intensity can then be increased without saturating the detector array, and the gain of the system can be increased. The analyser is positioned sufficiently close to an extinction in order not to saturate the array, whilst not so close as to introduce non-linearities into the system due to non-uniformities. The adjustment of the analyser angle, which can be manual or servo-mechanism controlled, can be used to account for variations in the average temperature of the array, i.e., as a form of background subtraction.

Other forms of light valve, envisaged as being within the scope of this invention, include those depending on temperature sensitive selective reflection, or, temperature sensitive birefringence. The valve may be an opto-electroptic hybird comprising: an infrared sensitive component, e.g., a component of ferroelectric, pyroelectric or photoelectric material; and, a light modulating component, a component including a nematic liquid crystal or an electro-optic solid.

The performance can be greatly improved with optical signal processing. Such processing optics can be inserted in the space between the light valve and the detector array. A spatial high pass filter may be implemented by means of a lens and a stop on the optic axis at the Fourier transform plane of this lens. The stop is arranged to remove most but not all of any pedestal which has zero spatial frequency. The quality of the image of higher spatial frequency is relatively little distorted if the stop has graded optical density at its edges (apodization). Controlling the way in which this grading varies with position allows tuning of the response of the imager in spatial frequency terms, typically allowing suppression of low spatial frequencies. A well graded density filter will reduce throughput at low spatial frequencies to produce optimum system modulation transfer (MTF). By reducing low spatial frequency non-uniformity and clutter, signal-to-noise at the important high spatial frequencies can be enhanced, for noise is not usually a function of spatial frequency. With such filtering, as pedestal is reduced, the analyser angle can be increased further from extinction without reaching saturation level. This leads to higher responsivity and a better linearity.

The imager of the invention is not restricted to the use of a single light source. Provided a stop is provided in the Fourier tranform plane for each source, and the sources are spaced far enough apart that their Fourier transform images do not overlap appreciably, then several sources can be used to enhance the light power throughout of the imager.

A stop can also be inserted in the Fourier transform plane to remove any scattered light at large distances from the optic axis, thus providing a low pass spatial filter.

More sophisticated optical signal processing functions are possible, such as convolution or correlation.

BRIEF INTRODUCTION OF THE DRAWINGS

In the drawings accompanying this specification:

FIG. 1 is a schematic block diagram to illustrate the arrangement of the components of an imager embodying the present invention;

FIGS. 2 and 3 are illustrative plan-views (not to scale) of two imagers of simple and more complex construction respectively, FIGS. 4 and 5 are graphs depicting the dependence of modulation transfer function with spatial frequency for an imager; firstly taken alone, and secondly taken with, a graded density filter; and FIG. 6 is a graph depicting the transmission profile of the graded density filter as a function of distance from the optical axis.

DESCRIPTION OF PREFERRED EMBODIMENTS

Figure 1:
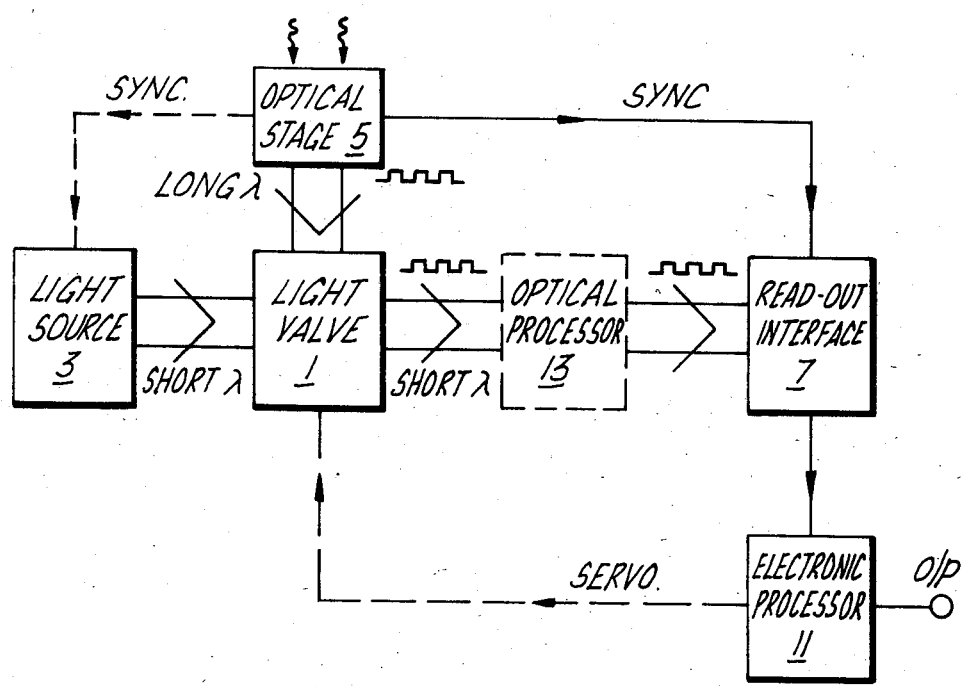

Embodiments of this invention will now be described, by way of example, only, with reference to the accompanying drawings:

At the heart of the imager shown in FIG. 1, there is an infrared sensitive light valve 1. The full area of this valve 1 is illuminated by means of a light source 3, and, radiation from a distant thermal scene is collected and directed onto the surface of the valve 1 by means of an optical stage 5. This stage 5 includes focus optics arranged to form a focussed image of the scene upon the valve 1, and also includes a chopper, which serves to interrupt periodically the radiation that is focussed upon the valve 1. This valve 1 serves to modulate the light in a manner that is dependent upon the intensity of infrared radiation incident upon each resolvable point of the valve surface. The moduated light, corresponding to each resolvable point, is relayed in parallel to form an image upon the surface of a read-out interface 7, an array of light sensitive detectors. The signal output of each of these detectors is relayed to a frame store, part of an electronic processor 11. By means of this processor, the signals stored for consecutive frames, those corresponding to the chopper in open, light field position, and those corresponding to the chopper in closed, dark field position, are subtracted to provide an output signal O/P which may then be used by video display for reconstruction of the image. Operation of the chopper and of the read-out interface 7 are synchronised. The light source may provide continuous illumination. Alternatively the light may be pulsed, in which case the pulses are synchronised with the chopper so that the valve 1 is illuminated towards the end of each half-cycle corresponding to the open and closed positions of the chopper. As an optional addition, an optical processor 13 may be inserted in the path of the modulated light between the light valve 1 and the read-out interface 7.

Figure 2:
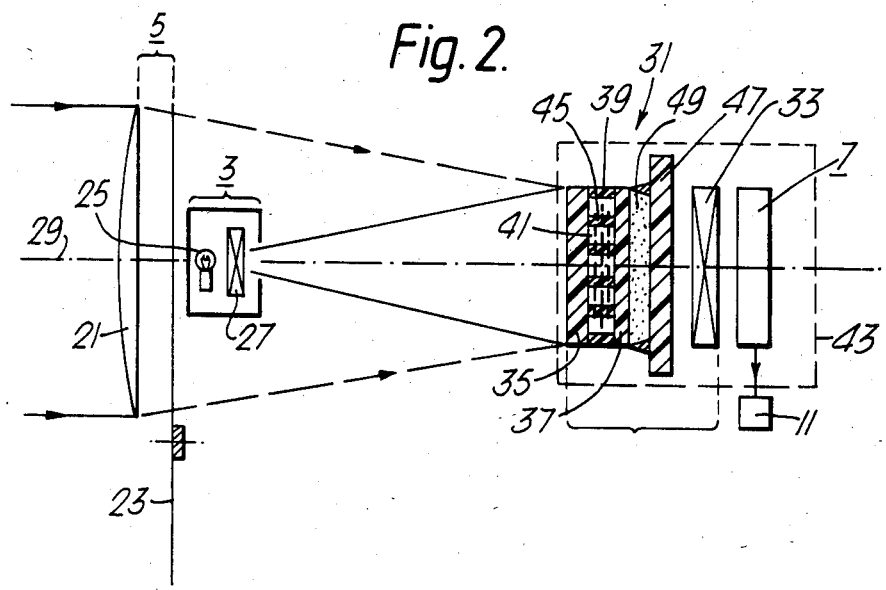

A simple construction of this imager is shown in FIG. 2. The optical stage 5 is comprised of an F/2 germanium lens objective 21, together with telescope optics (not shown) if required preceding this objective 21, and, followed by a chopper 23 in the path of the convergent beam. The light source 3 comprises a gallium arsenide light emitting diode 25 and a small area polariser 27. These are located immediately behind the objective 21 and are centred on the optical axis 29 of the lens objective 21. The light valve 1 is comprised of an infrared sensitive optically active liquid crystal cell 31 and an analyser 33. The analyser 33 is rotatable and its polarisation axis may be oriented to a position appropriately close to extinction. This analyser 33 is followed by a read-out interface 7, a detector array, the front-end of an infrared or visible charge coupled device detector. The analyser 33 and the interface 7 are arranged close to the cell so that the modulated light, passed by the analyser 33, is proximity focussed upon the surface of the detector array of the interface 7.

The cell 31, adopted for this example, is similar to one of known construction—see Prade et al, references as given above. It consists of two collodion pellicles 35 and 37, 25 mm in diameter and 8 μm in thickness, each side of an annular spacer 39 of for example plastic film such as Mylar (Trademark) material and of about 12 μm in thickness. The cell is filled with cholesteric material 41—for example a mixture of nematic crystal (Merck K18) and chiral molecules (Merck Co.). Alignment is aided by the addition of a small quantity of additive— for example Merck Kriptofix (Trademark) additive. As reported, the cholesteric-isotropic transition temperature occurs at 28° C. and at this temperature the cell exhibits a rotary power of about 30° per degree C. change of temperature.

The cell 31 is maintained in a constant temperature environment by means of an oven 43.

The resolvable regions of the cell may be isolated from each other. A grid spacer 45, between the pellicles 35 and 37, may be used for reticulation. This not only acts as a barrier to thermal diffusion, but also adds mechanical strength to the cell 31.

For reasons of both responsivity optimisation and noise reduction, the cell requires to be largely thermally isolated. However, a small degree of heat sinking proves beneficial to the achievement of good thermal uniformity over the cell. This can be achieved for an unreticulated cell using a sheet 47 of $BaF_2$, which is optically isotropic with high thermal conductivity. A layer 49 of gas at ambient pressure is sandwiched between the sheet 47 and the rear wall pellicle 37. This layer 49 would be of thickness between 10 and 200 μm, typically, to give a thermal time constant comparable to the chopping period (40 ms @ 25 Hz). Alternatively, any other low thermal conductance layer such as a vacuum could be employed.

Figure 3:
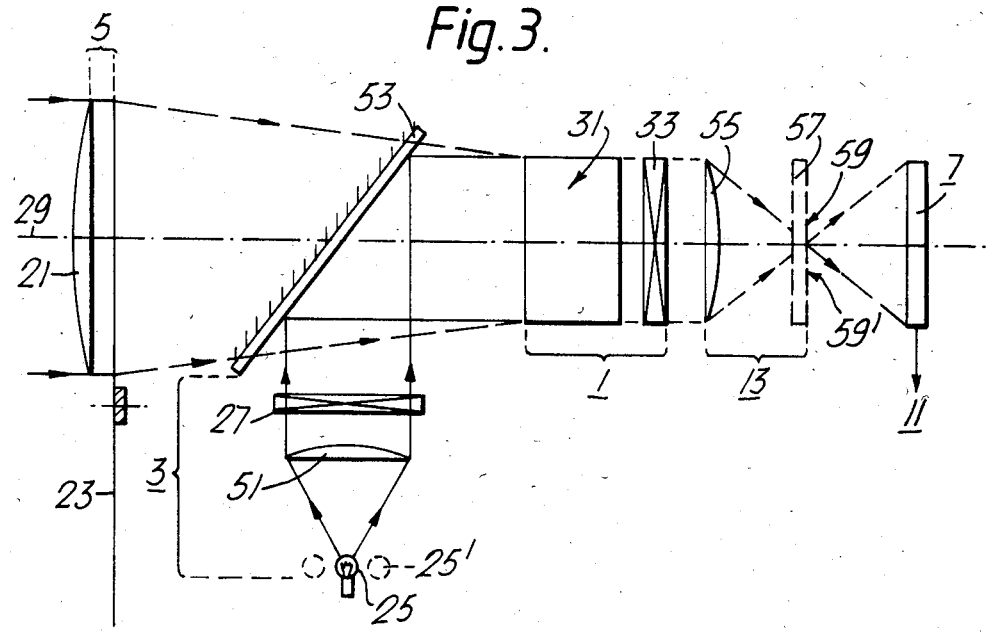

In the alternative arrangement shown in FIG. 3, the light source is mounted off-axis and the light is directed onto the cell 31 by means of an additional lens 51 and an inclined dichroic mirror 53. This mirror 53 passes infrared radiation directed from the objective 21. In this arrangement the modulated light is focussed onto the surface of the read-out interface 7 by another lens 55. An apodised stop filter 57 is inserted in the Fourier transform plane of this lens 55.

Figure 6:
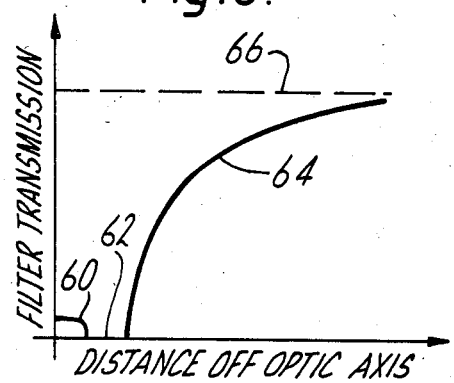
Figure 4:
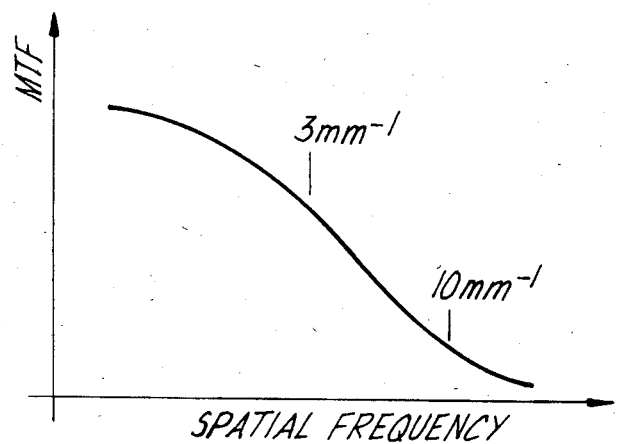
Figure 5:
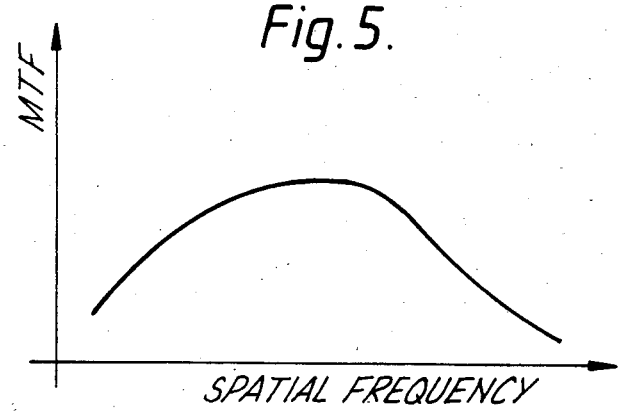

The modulation transfer function (MTF) of an unreticulated cell rolls off at higher spatial frequencies, as shown in FIG. 4. A region of much flattened MFT may be obtained by making the filter 57 of appropriately graded optical density. The filter 57 is made by forming a point image on the cell 31 and photographically recording its Fourier Transform. The resulting system MTF is shown in FIG. 5. The filter transmission as a function of distance from the optical axis 29 is shown in FIG. 6. The filter transmission has a small value 60 on and near the axis 29. Further from the optical axis, the transmission becomes zero at 62 and then increases as shown by curve 64 to a limit 66. The small axial value 60 ensures transmission of a small fraction of the zero spatial frequency or pedestal component of light. This improves optical signal magnitude and response linearity as compared to complete pedestal removal.

Photographic production of the filter 57 is well suited to systems having an array of light sources. Referring once more to FIG. 3, for spaced light source elements 25', a number of corresponding filter stop regions 59, 59' are provided.

We claim:
1. A thermal imager including:
   (1) a light valve responsive to absorption of infrared radiation by variation in reflectivity or transmittivity at shorter wavelengths,
   (2) imaging means for imaging a thermal scene on to the light valve,
   (3) modulating means arranged for intensity modulation of radiation from the scene such that the light valve experiences alternate light and dark field conditions,
   (4) a light source arranged for illumination of the light valve's responsive region,
   (5) detecting means for producing output signals in response to light from the source after passage via the light valve, and
   (6) electronic signal processing means arranged for output signal subtraction involving light and dark field signals as appropriate to provide compensation for light valve and light source inhomogeneity and temporal variation therein.
2. A thermal imager according to claim 1 arranged for parallel readout, and wherein the detecting means includes an array of detectors each arranged to monitor a respective light valve sub-region or pixel, and the light source is arranged to illuminate simultaneously all of the light valve's infrared responsive region, and the electronic signal processing means is arranged for output signal subtraction involving individual light and dark field pixel intensities.
3. A thermal imager according to claim 2 including a heat sink uniformly coupled to the light valve responsive region via a high thermal impedance.
4. A thermal imager according to claim 3 wherein the heak sink is a high thermal conductivity sheet and the thermal impedance is an evacuated or gas-filled space between the heat sink and the light valve responsive region.

5. A thermal imager according to claim 4 wherein the light valve comprises an infrared sensitive, optically active, liquid crystal cell and an optical polarization analyser.

6. A thermal imager according to claim 5 wherein the analyser is rotatable.

7. A thermal imager according to claim 6 wherein the analyser rotation is servo-mechanism controlled to follow changes in liquid crystal cell temperature.

8. A thermal imager according to claim 2 including one or more optical signal processing components arranged in a light path between the light valve and the detector array.

9. A thermal imager according to claim 8 wherein the optical signal processing components include a lens with a stop-filter in its Fourier transform plane.

10. A thermal imager according to claim 9 wherein the stop-filter has a central region arranged to transmit a portion of a zero spatial frequency component.

11. A thermal imager according to claim 10 wherein the stop-filter optical density is graded.

12. A thermal imager according to claim 9 wherein the light source comprises an array of source elements and the filter includes an array of corresponding stop regions.

13. A thermal imager according to claim 9 including a dichroic mirror arranged to reflect light from the source and to transmit infrared radiation from the scene on to the light valve.

14. A thermal imager according to claim 1 wherein the modulating means is a chopper.

15. A thermal imager according to claim 1 arranged such that infrared radiation from the scene and light from the source traverse different paths to a dichroic device, and thereafter the same path to the light valve.

16. A thermal imager according to claim 1 wherein the light source is arranged to provide pulsed light synchronised to operation of the modulating means such that illumination is provided towards the end of modulation half-cycles.

17. A thermal imager arranged for parallel readout including: a light valve responsive to absorption of infrared radiation by variation in reflectivity or transmittivity at shorter wave lengths, imaging means for imaging a thermal scene onto the light valve, modulating means arranged for intensity modulation of radiation from the scene falling on the light valve, a light source arranged for illumination of the light valve's responsive region, means for detecting light from the source after passage via the light valve, and electronic processing means arranged to provide an output signal indicating changes in detected light intensity produced by modulation of radiation from the scene received by the light valve, the detecting means including an array of detectors each arranged to monitor a respective light valve sub-region, the light source being arranged to illuminate simultaneously all of the light valve's infrared responsive region, and including a heat sink uniformly coupled to the light valve responsive region via a high thermal impedance.

18. A thermal imager according to claim 17 wherein the heat sink is a high thermal conductivity sheet and the thermal impedance is an evacuated or gas-filled space between the heat sink and the light valve responsive region.

19. A thermal imager according to claim 18 wherein the light valve comprises an infrared sensitive, optically active, liquid crystal cell and an optical polarization analyser.

20. A thermal imager according to claim 19 wherein the analyser is rotatable.

21. A thermal imager according to claim 20 wherein the analyser rotation is servo-mechanism controlled to follow changes in liquid crystal cell temperature.

22. A thermal imager arranged for parallel readout including: a light valve responsive to absorption of infrared radiation by variation in reflectivity or transmittivity at shorter wave lengths, imaging means for imaging a thermal scene onto the light valve, modulating means arranged for intensity modulation of radiation from the scene falling on the light valve, a light source arranged for illumination of the light valve's responsive region, means for detecting light from the source after passage via the light valve, and electronic processing means arranged to provide an output signal indicating changes in detected light intensity produced by modulation of radiation from the scene received by the light valve, the detecting means including an array of detectors each arranged to monitor a respective light valve sub-region, the light source being arranged to illuminate simultaneously all of the light valve's infrared responsive region, and including one or more optical signal processing components arranged in a light path between the light valve and the detector array.

23. A thermal imager according to claim 22 wherein the optical signal processing components include a lens with a stop-filter in its Fourier transform plane.

24. A thermal imager according to claim 23 wherein the stop-filter has a central region arranged to transmit a portion of a zero spatial frequency component.

25. A thermal imager according to claim 24 wherein the stop-filter optical density is graded.

26. A thermal imager according to claim 23 wherein the light source comprises an array of source elements and the filter includes an array of corresponding stop regions.

27. A thermal imager according to claim 23 including a dichroic mirror arranged to reflect light from the source and to transmit infrared radiation from the scene on to the light valve.

28. A thermal imager including: a light valve responsive to absorption of infrared radiation by variation in reflectivity or transmittivity at shorter wave lengths, imaging means for imaging a thermal scene onto the light valve, modulating means arranged for intensity modulation of radiation from the scene falling on the light valve, a light source arranged for illumination of the light valve's responsive region, means for detecting light from the source after passage via the light valve, and electronic processing means arranged to provide an output signal indicating changes in detected light intensity produced by modulation of radiation from the scene received by the light valve, the arrangement being such that infrared radiation from the scene and light from the source traverse different paths to a dichroic device, and thereafter the same path to the light valve.

29. A thermal imager including: a light valve responsive to absorption of infrared radiation by variation in reflectivity or transmittivity at shorter wave lengths, imaging means for imaging a thermal scene onto the light valve, modulating means arranged for intensity modulation of radiation from the scene falling on the light valve, a light source arranged for illumination of the light valve's responsive region, means for detecting light from the source after passage via the light valve, and electronic processing means arranged to provide an output signal indicating changes in detected light intensity produced by modulation of radiation from the scene received by the light valve, the light source being arranged to provide pulsed light synchronized with operation of the modulating means such that illumination is provided toward the end of modulation half-cycles.

* * * * *